United States Patent
Hsu et al.

(10) Patent No.: US 7,810,959 B2
(45) Date of Patent: Oct. 12, 2010

(54) BACKLIGHT MODULE

(75) Inventors: Chih-Peng Hsu, Miao-Li Hsien (TW); Hung-Kuang Hsu, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 213 days.

(21) Appl. No.: 12/177,428

(22) Filed: Jul. 22, 2008

(65) Prior Publication Data
US 2009/0168431 A1 Jul. 2, 2009

(30) Foreign Application Priority Data
Dec. 29, 2007 (CN) ............... 200710203578

(51) Int. Cl.
*F21V 29/00* (2006.01)
(52) U.S. Cl. ............... 362/294; 362/96; 362/373; 362/615
(58) Field of Classification Search ............ 362/96, 362/294, 373, 612, 613, 615, 628, 630–632
See application file for complete search history.

(56) References Cited

U.S. PATENT DOCUMENTS

| | | | |
|---|---|---|---|
| 7,036,946 B1 * | 5/2006 | Mosier | 362/27 |
| 7,288,796 B2 * | 10/2007 | Dry | 257/88 |
| 2005/0152146 A1 * | 7/2005 | Owen et al. | 362/294 |
| 2006/0072344 A1 * | 4/2006 | Kim et al. | 362/632 |
| 2006/0192750 A1 | 8/2006 | Lai | |
| 2007/0247851 A1 * | 10/2007 | Villard | 362/294 |

FOREIGN PATENT DOCUMENTS

| | | |
|---|---|---|
| TW | 493367 | 7/2002 |
| TW | 200630685 A | 9/2006 |
| TW | 200734757 A | 9/2007 |

\* cited by examiner

*Primary Examiner*—Thomas M Sember
(74) *Attorney, Agent, or Firm*—Andrew C. Cheng

(57) ABSTRACT

A backlight module includes a light guide plate, a light source and a ventilating tube. The light guide plate includes a light exiting surface and a light incident surface adjacent the light exiting surface. The light source includes a plurality of light emitting diodes facing the light incident surface of the light guide plate. The ventilating tube is thermally connected to the light source. The ventilating tube defines an air inlet in one first end, an air outlet in an opposite second end, and an air passage channel interconnecting the air inlet to the air outlet. The air outlet is at a higher altitude than the air inlet along a gravitational force direction.

10 Claims, 5 Drawing Sheets

BACKLIGHT MODULE

BACKGROUND

1. Technical Field

The present invention relates to a backlight module using principles of natural ventilation for improving heat dissipation efficiency.

2. Description of Related Art

Liquid crystal display (LCD) devices are very popular display devices because of its thin size, low weight, and low power consumption. Generally, an LCD device includes an LCD backlight module as shown in FIG. 5. A typical LCD backlight module 60 includes a mount 64, a waveguide 62 supported on the mount 64, and two LED arrays 72 positioned adjacent to two opposite sides 70 of the waveguide 62. Two sidewalls of the mount 64 are located adjacent to printed wiring boards 74 of the LED arrays 72 for dissipating heat generated by the LED arrays 72.

However, during operation of the LCD backlight module 60, only 10-20% of the power consumed by the LED arrays 72 is converted to light, and approximately 80-90% of the power is converted to heat. The mount 62 cannot effectively remove all of the heat generated by the LED arrays 72, thus causing the LED arrays 72 to overheat and significantly reducing the performance and service lifetime of the LED arrays 72.

Therefore an improved backlight module is desired to overcome the above-mentioned disadvantages.

SUMMARY

A backlight module includes a light guide plate, a light source and a ventilating tube. The light guide plate includes a light exiting surface and a light incident surface adjacent the light exiting surface. The light source includes a plurality of light emitting diodes facing the light incident surface of the light guide plate. The ventilating tube is thermally connected to the light source. The ventilating tube defines an air inlet in one first end, an air outlet in an opposite second end, and an air passage channel interconnecting the air inlet to the air outlet. The air outlet is at a higher altitude than the air inlet along a gravitational force direction.

Other advantages and novel features of the present invention will become more apparent from the following detailed description of preferred embodiment when taken in conjunction with the accompanying drawings.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE EMBODIMENTS

Figure 1:
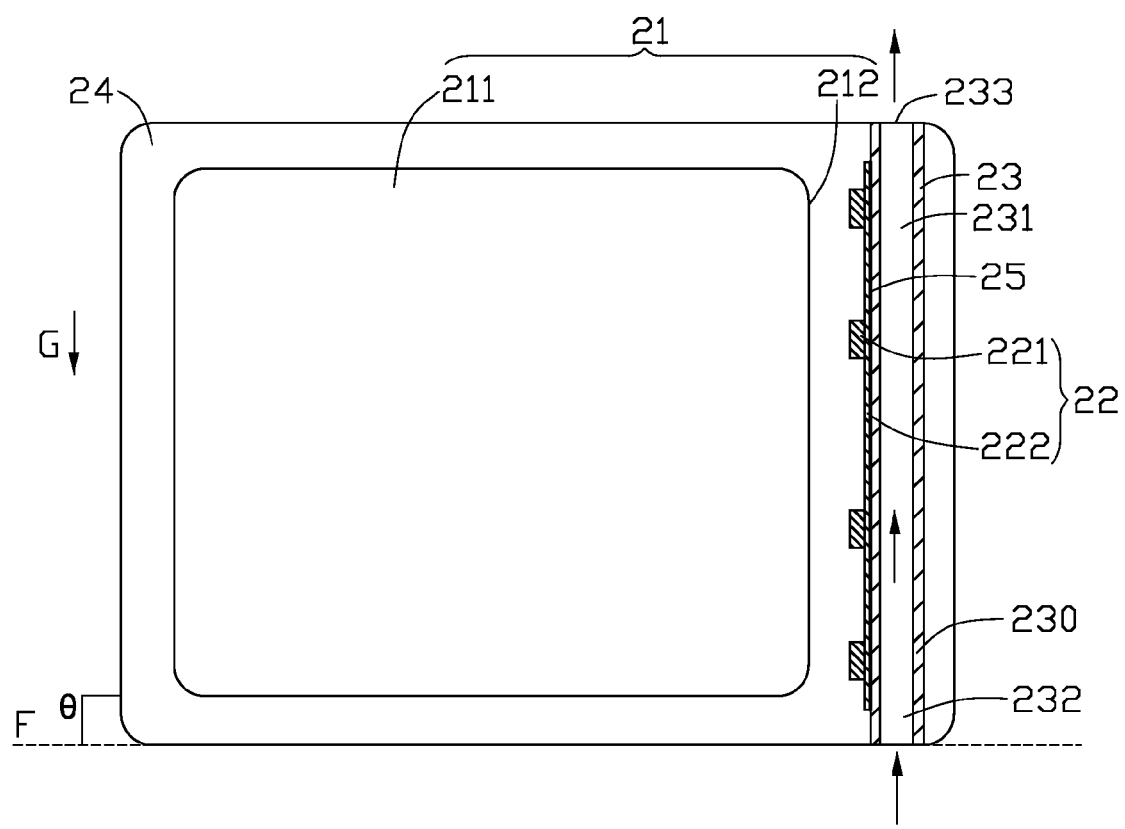
FIG. 1 is a cross-sectional view of a backlight module comprising a light guide plate, a light source, and a first embodiment of a ventilating tube.

Referring to FIG. 1, a backlight module includes a light guide plate 21, a light source 22 and a first embodiment of a ventilating tube 23. The light guide plate 21, the light source 22, and the ventilating tube 23 are mounted on a frame 24.

The light guide plate 21 includes a light exiting surface 211, an opposite rear surface (not shown) and a plurality of side surfaces 212 interconnecting the light exiting surface 211 with the rear surface. The light exiting surface 211 is substantially rectangular.

In the first embodiment, the ventilating tube 23 is an elongated hollow tube. The ventilating tube 23 includes a round tube-like casing 230 and an air passage channel 231 defined in the casing 230. The ventilating tube 23 is located adjacent to a right side surface 212 and extends along a direction of the right side surface 212. The ventilating tube 23 can be made of a highly thermally conductive material such as aluminum (Al), copper (Cu), Al alloys, or Cu alloys. An air outlet 233 is defined in a top end of the ventilating tube 23. An opposite air inlet 232 is defined in an opposite bottom end of the ventilating tube 23. In the first embodiment, the ventilating tube 23 is positioned along a gravitational force direction G and the central axis of the ventilating tube 23 forms a right angle θ to a horizontal reference surface F. The air outlet 233 is at a higher altitude than the air inlet 232 along the gravitational force direction G. In other embodiments, the angle θ can be changed, so long as the air outlet 233 is at a higher altitude than the air inlet 232 along the gravitational force direction G.

The light source 22 is positioned between the ventilating tube 23 and the right side surface 212. The light source 22 includes a printed circuit broad (PCB) 222 and a plurality of light emitting diodes (LEDs) 221 electrically connected to the PCB 222. The PCB 222 is thermally attached to the casing 230 and faces the light guide plate 21. In the first embodiment, the PCB 222 is a metal core printed circuit board (MCPCB). The LEDs 221 are arranged along a longitudinal direction of the ventilating tube 23 and are thermally connected to the ventilating tube 23 via the PCB 222.

The LEDs face the right side surface 212 of the light guiding plate 21. The light source 22 is a linear light source because the linearly arrayed LEDs 221 are located at the right side of the light guide plate 21. The right side surface 212 of the light guide plate 21 functions as a light incident surface of the light guide plate 21. The light emitted from the LEDs 221 is incident to an interior of the light guide plate 21 from the right side surface 212 and is guided to spread out of the light guide plate 21 from the light exiting surface 211.

The heat generated from the LEDs 221 of the backlight module is transferred to the ventilating tube 23, and dissipated from the ventilating tube 23 to the air flowing through the air passage channel 231 by convection or natural ventilation. Natural ventilation, unlike fan-forced ventilation, uses the natural forces of wind and buoyancy to drive cool air to move. Buoyancy ventilation may be temperature-induced such as stack ventilation or humidity-induced such as cool tower. In the first embodiment, temperature-induced ventilation is adopted. A formula for the ventilation rate for temperature-induced ventilation is expressed below:

$$Q = C_d A_o \sqrt{\frac{2gL\sin\theta \frac{(T_b - T_i)}{T_o}}{1 + A_r^2}},$$

where the following symbols used in the expression:

Q: ventilation rate ($m^3/s$);

$C_d$: 0.65~0.70, discharge constant;

$A_o$: effective cross-sectional area of the air outlet 233 of the ventilating tube 23 ($m^2$);

g: 9.807 ($m/s^2$), gravitational acceleration;

L: length of the ventilating tube 23;

θ: angle formed between the central axis of the ventilating tube 23 and the horizontal reference surface F;

$T_b$: average temperature of air in the air passage channel 231 of the ventilating tube 23 (K);

$T_i$: temperature of the air inlet 232 of the ventilating tube 23 (K);

$T_o$: temperature of the air outlet 233 of the ventilating tube 23 (K);

$A_r$: ratio between the effective cross-sectional area of the air outlet 233 $A_o$ ($m^2$) and the effective cross-sectional area of the air inlet 232 $A_i$ ($m^2$).

When the backlight module is in operation, the heat generated from the LEDs 221 is transferred to the casing 230 through the PCB 222. The heat from the casing 230 causes the air temperature in the air passage channel 231 to rise, generating a buoyancy of the warm air in the air passage channel 231 because warm air is lighter than cool air. The warm air rises towards the air outlet 233 due to the buoyancy and exits the air outlet 233 into the ambient environment. Simultaneously, cool air in the ambient environment enters through the air inlet 232 because the air pressure in the air passage channel 231 is lower than the air pressure of the ambient environment from the warm air exiting the ventilating tube 23. Thus, an airflow circulatory system is formed between the air in the air passage channel 231 and the air in the ambient environment. The air flow direction in the airflow circulatory system is illustrated in FIG. 1 by arrows.

Figure 2:
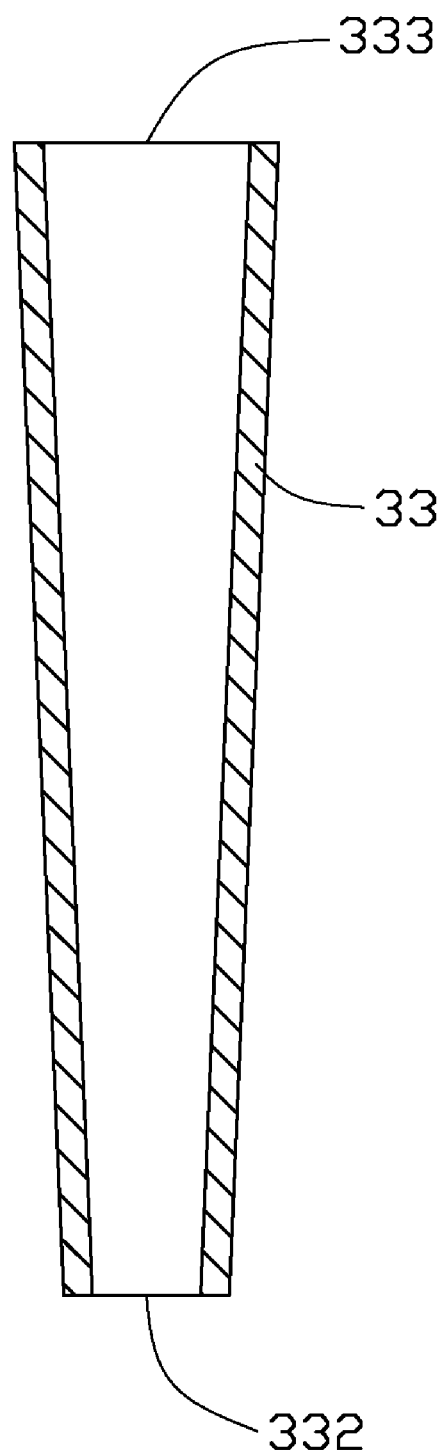
FIG. 2 is a cross-sectional view of a second embodiment of a ventilating tube.

FIG. 2 shows a second embodiment of a ventilating tube 33. The ventilating tube 33 has an effective cross-sectional area of the air outlet 333 is larger than the effective cross-sectional area of the air inlet 332. According to the formula for the temperature-induced ventilation expressed above, when the effective cross-sectional area $A_o$ of the air outlet 333 of the ventilating tube 33 is increased and the other variables remain unchanged, the ventilation rate Q of the ventilating tube 33 is also increased. This means that the warm air rises out through the air outlet 333 due to the buoyancy and exits into the ambient environment faster, allowing more cool air in the ambient environment to enter the ventilating tube 33 through the air inlet 332, and dissipating the heat generated from the backlight module into the ambient environment more rapidly than in the first embodiment of the ventilating tube 23.

Figure 3:
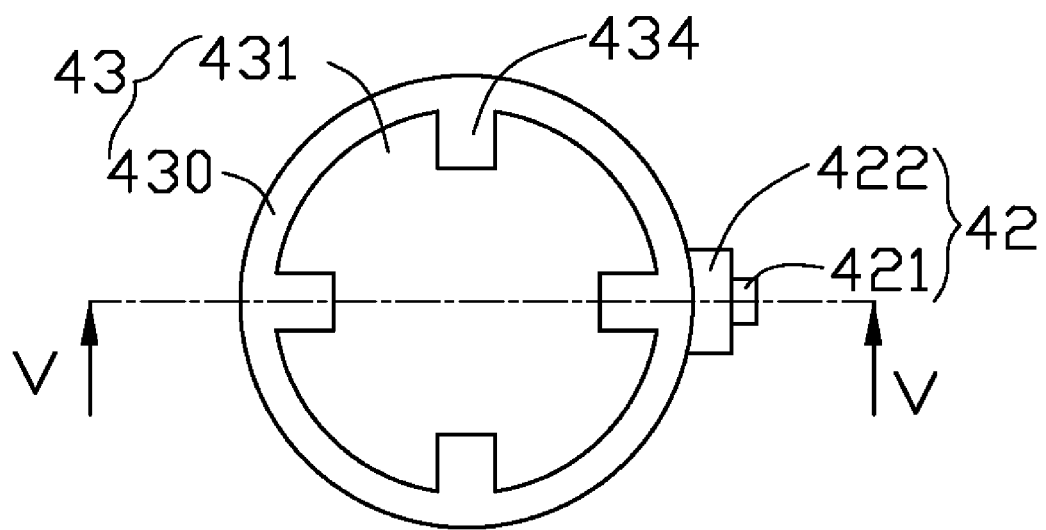
FIG. 3 is a top plan view of a third embodiment of a ventilating tube.

Referring to FIG. 3, a third embodiment of a ventilating tube 43 has a similar configuration to the ventilating tube 33 of FIG. 2. The ventilating tube 43 includes a casing 430, an air passage channel 431 defined in the casing 431, a light source 42, and a plurality of heat dissipation fins 434. The light source 42 comprises a PCB 422 attached to an outer surface of the casing 430 and a plurality of LEDs 421 electrically connected and mounted to the PCB 422. The heat dissipation fins 434 protrude inwardly from an inner surface of the casing 430 and extend along the longitudinal direction of the casing 430.

The heat dissipation fins 434 increase the total contact surface area with the air flowing through the air passage channel 431, thereby increasing the heat conduction rate of the ventilating tube 43. According to the formula for the temperature-induced ventilation expressed above, when the average temperature $T_b$ of the air in the air passage channel 431 of the ventilating tube 43 is increased and the other variables remain unchanged, the ventilation rate Q of the ventilating tube 43 is also increased. In another embodiment, the heat dissipation fins 434 can be formed on an outer surface of the casing 430.

Figure 4:
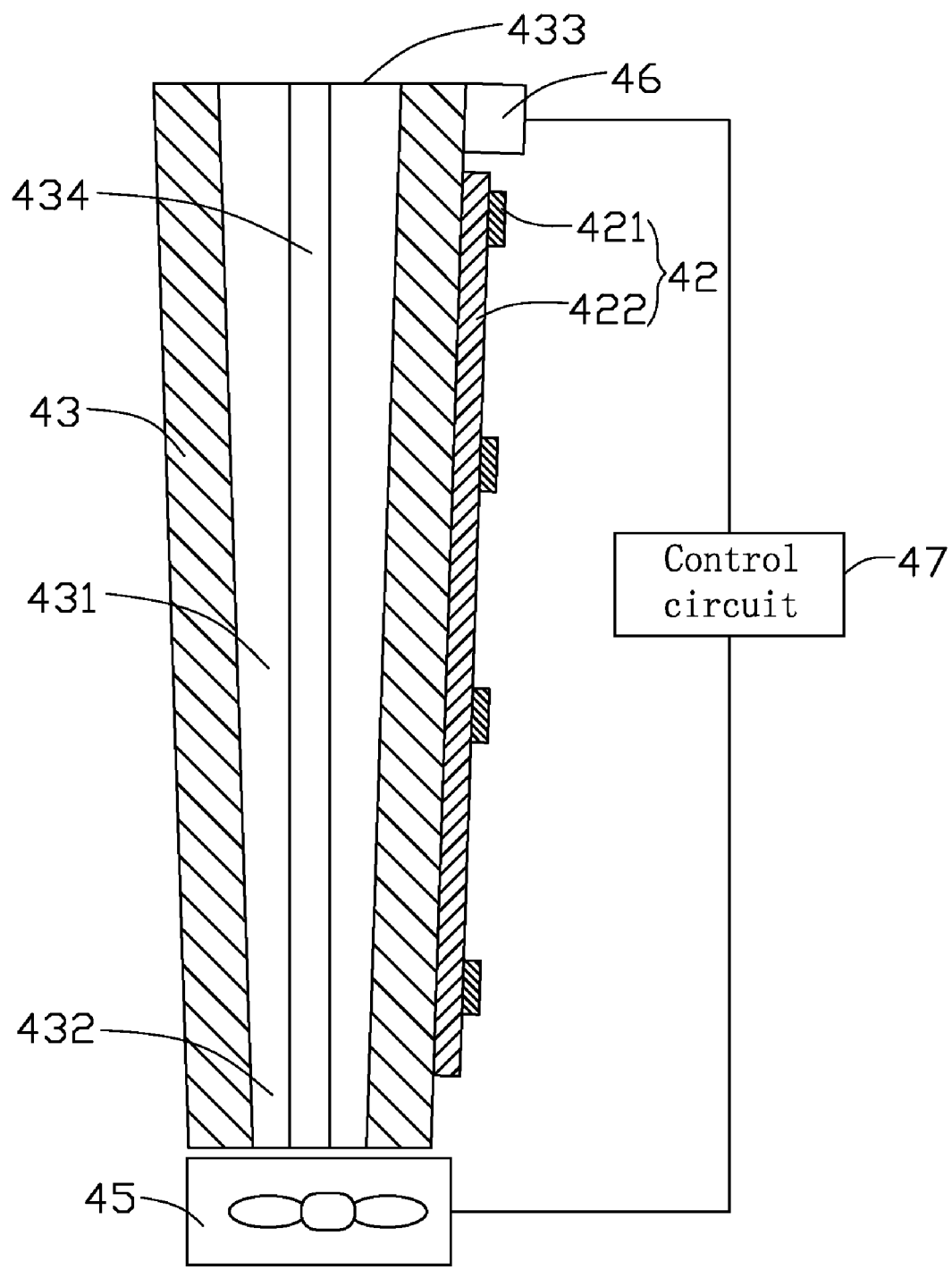
FIG. 4 is a cross-sectional view of the ventilating tube of FIG. 3, taken along line IV-IV, a fan, a control circuit, and a temperature sensor.
Figure 5:
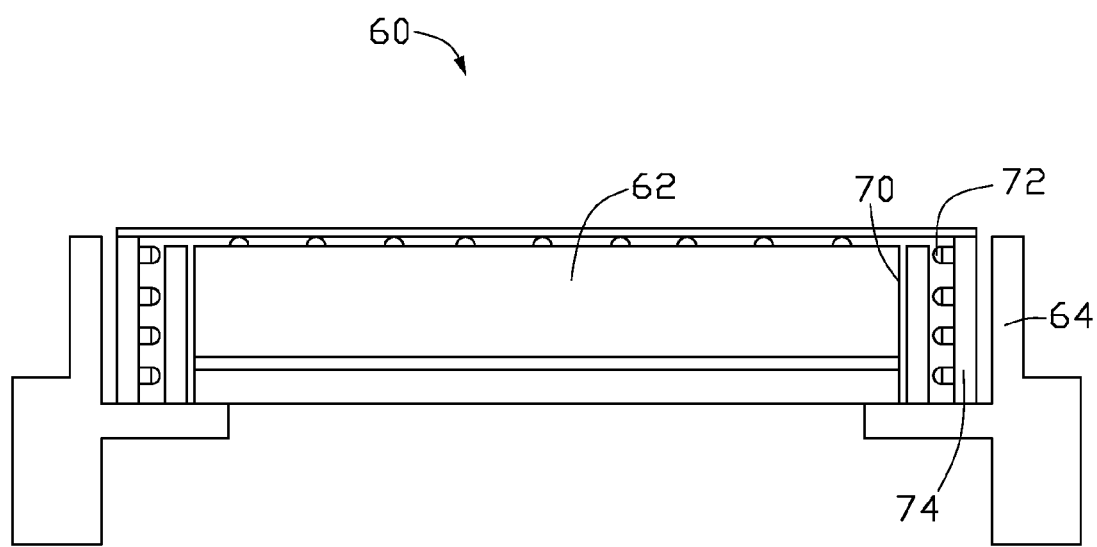
FIG. 5 is a cross-sectional view of a liquid crystal display device comprising a backlight module in accordance with related art.

Referring also to FIG. 4, a backlight module (not shown) including the third embodiment of the ventilating tube 43, further comprises a fan 45, a temperature sensor 46, and a control circuit 47. The fan 45 is mounted on a bottom end of the ventilating tube 43 and is located adjacent to an air inlet 432 defined at the bottom end of the ventilating tube 43. The temperature sensor 46 is mounted on an outer surface of the casing 430 and is located adjacent to an air outlet 433 defined at a top end of the ventilating tube 43 opposite the air inlet 432. The temperature sensor 46 is thermally connected to the ventilating tube 43 to sense an operation temperature of the light source 42 and output a feedback signal corresponding to the sensed operation temperature. In another embodiment, the temperature sensor 46 is thermally connected to the light source 42. The control circuit 47 is electrically connected between the fan 45 and the temperature sensor 46. The control circuit 47 receives the feedback signal from the temperature sensor 46 to control the operation of the fan 45 to keep the operation temperature of the light source 42 within a suitable range. More specifically, the temperature sensor 46 stores a predetermined temperature value so that if the light source 42 overheats and the temperature sensor 46 senses the operation temperature of the light source 42 is higher than the predetermined temperature value, a feedback signal is outputted to the control circuit 47 and the fan 45 is turned on. The fan 45 generates an airflow to increase the heat dissipation efficiency of the ventilating tube 43 and lower the operation temperature of the light source 42. When the operation temperature of the light source 42 is lowered to a value smaller than the predetermined temperature value, the temperature sensor 46 outputs a feedback signal to the control circuit 47 and the fan 45 is turned off.

In another embodiment, the fan 45 can be mounted adjacent to the air outlet 433. In this embodiment, the fan 45 draws warm air out of the air passage channel 431 through the air outlet 433 into the ambient environment.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module comprising:

a light guide plate comprising a light exiting surface and a light incident surface adjacent the light exiting surface;

a light source comprising a plurality of light emitting diodes facing the light incident surface;

a ventilating tube thermally connected to the light source, the ventilating tube defining an air inlet in a first end, an air outlet in an opposite second end, and an air passage channel interconnecting the air inlet to the air outlet, the air outlet being at a higher altitude than the air inlet along a gravitational force direction;

a fan positioned adjacent to the air inlet;

a temperature sensor thermally connected to the light source; and a control circuit electrically connected between the fan and the temperature sensor;

wherein the temperature sensor senses an operation temperature of the light source and outputs a feedback signal to the control circuit to control an operation of the fan.

2. The backlight module of claim 1, wherein an effective cross-sectional area of the air outlet of the ventilating tube is larger than that of the air inlet.

3. The backlight module of claim 1, wherein a plurality of heat dissipation fins are protruding inwardly from an inner surface of the ventilating tube.

4. The backlight module of claim 1, wherein the temperature sensor is thermally connected to an outside surface of the ventilating tube.

5. The backlight module of claim 1, wherein the light source further comprises a printed circuit board for electrically supporting the light emitting diodes, the print circuit broad is thermally connected to an outside surface of the ventilating tube, wherein the light emitting diodes arranged along a longitudinal direction of the ventilating tube to face the light incident surface of the light guiding plate.

6. A backlight module comprising:
a light guide plate comprising a light exiting surface and a light incident surface adjacent the light exiting surface;
a light source comprising a printed circuit board and a plurality of light emitting diodes electrically connected to the printed circuit board, the light emitting diodes arranged on the printed circuit board and facing the light incident surface;
a ventilating tube thermally connected to the printed circuit board of the light source, the ventilating tube defining an air inlet in one first end, an air outlet in an opposite second end, and an air passage channel interconnecting the air inlet to the air outlet, the air outlet being at a higher altitude than the air inlet along a gravitational force direction, wherein the air contained in the air passage channel absorbs heat generated by the light source and moves through the air outlet to dissipate the heat to an ambient environment; and a fan located adjacent the air inlet, a temperature sensor thermally connected to the ventilating tube and a control circuit electrically connected between the fan and the temperature sensor, the temperature sensor senses an operation temperature of the light source and outputs a feedback signal to the control circuit to control an operation of the fan.

7. The backlight module of claim 6, wherein the ventilating tube is parallel to the gravitational direction.

8. The backlight module of claim 6, wherein an effective cross-sectional area of the air outlet of the ventilating tube is larger than that of the air inlet.

9. The backlight module of claim 6, wherein a plurality of heat dissipation fins are protruding inwardly from an inner surface of the ventilating tube.

10. A backlight module comprising:
a light guide plate comprising a light exiting surface and a light incident surface adjacent the light exiting surface;
a light source comprising a plurality of light emitting diodes facing the light incident surface;
a ventilating tube thermally connected to the light source, the ventilating tube defining an air inlet in a first end, an air outlet in an opposite second end, and an air passage channel interconnecting the air inlet to the air outlet, the air outlet being at a higher altitude than the air inlet along a gravitational force direction;
a fan positioned adjacent to the air outlet;
a temperature sensor thermally connected to the light source; and
a control circuit electrically connected between the fan and the temperature sensor;
wherein the temperature sensor senses an operation temperature of the light source and outputs a feedback signal to the control circuit to control an operation of the fan.

* * * * *